(12) United States Patent
Luo et al.

(10) Patent No.: US 12,606,226 B2
(45) Date of Patent: Apr. 21, 2026

(54) FOLDING CARTS

(71) Applicant: SINOWELL (SHANGHAI) CO., LTD., Shanghai (CN)

(72) Inventors: Jia Luo, Shanghai (CN); Liang Zhou, Shanghai (CN); Yunfei Duan, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 282 days.

(21) Appl. No.: 18/475,175

(22) Filed: Sep. 26, 2023

(65) Prior Publication Data

US 2024/0286660 A1 Aug. 29, 2024

(30) Foreign Application Priority Data

Feb. 24, 2023 (CN) .......................... 202320311406.6

(51) Int. Cl.
B62B 3/02 (2006.01)
B62B 5/06 (2006.01)

(52) U.S. Cl.
CPC ................ B62B 3/022 (2013.01); B62B 5/06 (2013.01); B62B 2205/06 (2013.01)

(58) Field of Classification Search
CPC ......... B62B 3/022; B62B 3/025; B62B 3/007; B62B 3/02; B62B 3/027; B62B 5/06; B62B 2205/06; B62B 2205/30; B62B 2205/02
See application file for complete search history.

(56) References Cited

U.S. PATENT DOCUMENTS

| | | | | |
|---|---|---|---|---|
| 9,327,749 B2 * | 5/2016 | Young | .......................... | B62B 5/08 |
| 10,633,010 B1 | 4/2020 | Zhang | | |
| 11,958,520 B1 * | 4/2024 | Sun | .......................... | B62B 5/067 |
| 2022/0041199 A1 * | 2/2022 | Tong | .......................... | B62B 3/025 |

* cited by examiner

*Primary Examiner* — Steve Clemmons
(74) *Attorney, Agent, or Firm* — METIS IP LLC

(57) ABSTRACT

The present disclosure provides a folding cart. The folding cart includes a cart frame assembly, a wheel assembly, and a handrail assembly. The cart frame assembly may include a plurality of sets of support rod assemblies and a base frame hinged to lower ends of the plurality of sets of support rod assemblies. The wheel assembly may be disposed at a lower end of the cart frame assembly to realize movement of the cart frame assembly. The handrail assembly may be disposed on the cart frame assembly. The cart frame assembly may be driven to move through the handrail assembly under an action of an external force. The handrail assembly may be rotatably connected to the cart frame assembly to make the handrail assembly rotate at least on a first plane.

18 Claims, 12 Drawing Sheets

1000

1000

1520

1510

1521

1511

1000

1111

1400

1600

1500

1200

1000

1000

FOLDING CARTS

CROSS-REFERENCE TO RELATED APPLICATION

This application claims priority to Chinese Patent Application No. 202320311406.6, filed on Feb. 24, 2023, the entire contents of which are hereby incorporated herein by reference.

TECHNICAL FIELD

The present disclosure relates to the field of carts, and in particular, to a folding cart.

BACKGROUND

A cart is widely used as a transportation tool in daily life, and the cart is easy to use and easy to maintain. However, when the cart is not used, it is inconvenient to store the cart.

In view of the above problems, CN216833753U proposes a new type of cart. When the cart is not used, the new type of cart may be folded and stored, so that the new type of cart does not take up space when the cart is stored, and the convenience of storage is improved. The new type of cart includes a cart frame and a roller assembly. The roller assembly is mounted at four corners of the frame. The cart frame includes a front wall assembly, a rear wall assembly, two sidewall assemblies, two sets of telescopic rods, and a base frame assembly located at the bottom. There are two telescopic rods included in each set of telescopic rods. The front wall assembly and the rear wall assembly are respectively hinged to front ends and rear ends of the two sets of telescopic rods. The two sidewall assemblies are respectively hinged between the two telescopic rods in each set. The base frame assembly is hinged to the lower ends of the four telescopic rods. After the new type of cart is folded, the telescopic rods are extended, and a height of the overall storage space becomes higher, which is not conducive to the storage. Moreover, an unfolded length of the new type of cart is limited by a folded height of the sidewall assembly. If the length of the new type of cart is too long, the higher the height of the folded sidewall assembly is, which will cause the folded sidewall assembly to interfere with the roller assembly.

Therefore, the present disclosure proposes a folding cart whose overall height is not changed when the cart is folded and stored, and a cart frame assembly is not interfere with a wheel assembly when the cart is folded.

SUMMARY

One of the embodiments of the present disclosure provides a folding cart. The folding cart includes: a cart frame assembly, a wheel assembly, and a handrail assembly. The cart frame assembly may include a plurality of sets of support rod assemblies and a base frame hinged to lower ends of the plurality of sets of support rod assemblies, wherein for one set of support rod assemblies, the one set of support rod assemblies may include at least two support rods, and two adjacent support rods may be hinged through a first connecting part in the one set of support rod assemblies; an upper end of the first connecting part may be fixedly hinged to the at least two support rods, a lower end of the first connecting part may be slidingly hinged to the at least two support rods, and the first connecting part and the base frame may be hinged through at least one second connecting part; and the first connecting part and the at least one second connecting part may be folded along a first horizontal direction, and two support rods oppositely disposed on a same side in two adjacent sets of the plurality of sets of support rod assemblies may be connected through a third connecting part. The wheel assembly may be disposed at a lower end of the cart frame assembly to realize movement of the cart frame assembly. The handrail assembly may be disposed on the cart frame assembly, and the cart frame assembly may be driven to move through the handrail assembly under an action of an external force. The handrail assembly may be rotatably connected to the cart frame assembly to make the handrail assembly rotate at least on a first plane.

In some embodiments, the handrail assembly may include a handrail rod, at least one fixing mount, and at least one rotating connector. The at least one fixing mount may be fixedly connected to the cart frame assembly, and the handrail rod may be rotatably connected to the at least one fixing mount through the at least one rotating connector to make the handrail rod rotate around the at least one fixing mount at least on the first plane.

In some embodiments, the handrail rod may include two diagonal struts, a vertical rod, and a connecting mount. One end of each of the two diagonal struts may be fixedly connected to the vertical rod through the connecting mount, and another end of the each of the two diagonal struts may be rotatably connected to two fixing mounts of the at least one fixing mount through two rotating connectors of the at least one rotating connector. The two fixing mounts may be symmetrically fixed on the two support rods in the one set of support rod assemblies.

In some embodiments, the handrail assembly may include at least one fixing mount, a handrail cross rod, a handrail vertical rod, and a universal adapter. The at least one fixing mount may be fixedly connected to the cart frame assembly, and the two ends of the handrail cross rod may be fixedly connected to two fixing mounts of the at least one fixing mount. The handrail vertical rod may be rotatably connected to the handrail cross rod through the universal adapter to make the handrail vertical rod rotate around the universal adapter at least on the first plane or a second plane.

In some embodiments, the third connecting part may be hinged between the two support rods disposed on the same side in the plurality of sets of support rod assemblies, an upper end of the third connecting part may be fixedly hinged to the support rods disposed on the same side, a lower end of the third connecting part may be slidingly hinged to the support rods disposed on the same side, the third connecting part may be folded along a second horizontal direction, and the base frame may be folded along the vertical direction.

In some embodiments, an upper end of the support rod disposed on the same side may be fixedly provided with a fixing hinged mount, and the support rod disposed on the same side may be slidingly sleeved with a sliding hinged mount along an axis direction of the support rod disposed on the same side, and the upper ends of the first connecting part and the third connecting part may be hinged to the fixing hinged mount, and the lower ends of the first connecting part and the third connecting part may be hinged to the sliding hinged mount.

In some embodiments, the first connecting part may include a plurality of mutually hinged long rod hinged sets. For each long rod hinged set, the long rod hinged set may include a first long rod and a second long rod that are mutually hinged and distributed in an X-shape. Outer ends of two first long rods in the two long rod hinged sets located on an outermost side may be respectively hinged to two fixing hinged mounts. Outer ends of two second long rods in the two long rod hinged sets located on the outermost side may be respectively hinged to two sliding hinged mounts. The at least one second connecting part may be hinged between the base frame and a long rod hinged set located in a middle of the plurality of mutually hinged long rod hinged sets.

In some embodiments, the third connecting part may include a plurality of mutually hinged short rod hinged sets. For each short rod hinged set, the short rod hinged set may include a first short rod and a second short rod that are mutually hinged and distributed in an X-shape. Outer ends of two first short rods in the two short rod hinged sets located on an outermost side may be respectively hinged to two fixing hinged mounts. Outer ends of two second short rods in the two short rod hinged sets located on the outermost side may be respectively hinged to two sliding hinged mounts.

In some embodiments, the at least one second connecting part may include two first folding pieces and two second folding pieces. Each of the two first folding pieces and each of the two second folding pieces may be hinged with each other. One end of each of the two first folding pieces away from the first connecting part may be hinged to the base frame, and one end of each of the two second folding pieces away from the base frame may be hinged to the first connecting part.

In some embodiments, the each of the two first folding pieces may be provided with a groove, and the each of the second folding pieces may be provided with a bending boss. The bending boss may be limited in the inside the groove when the at least one second connecting part is unfolded.

In some embodiments, the base frame may include four first hinged mounts, two second hinged mounts, and two sets of hinged frames. The four first hinged mounts may be respectively fixed on four support rods in the two adjacent sets of the plurality of sets of support rod assemblies. The two second hinged mounts may be respectively connected to lower ends of the two second connecting parts of the at least one second connecting part. One set of hinged frame may be hinged between two first hinged mounts of the four first hinged mounts and one end of the two second hinged mounts Another set of hinged frames may be hinged between another two first hinged mounts of the four first hinged mounts and another end of the two second hinged mounts. The two sets of hinged frames may be folded along a vertical direction.

In some embodiments, for each hinged frame, the hinged frame may include an X-shaped hinged mount and four hinged rods. Two of the four hinged rods may be in a set and distributed in an X-shape. One set of hinged rods may be hinged between one first hinged mount of the four first hinged mounts and one second hinged mount of the two second hinged mounts. Another set of hinged rods may be hinged between another first hinged mount of the four first hinged mounts and another second hinged mount of the two second hinged mounts. Axes of the two hinged rods in each set may coincide with each other and may be hinged through the X-shaped hinged mount.

In some embodiments, the X-shaped hinged mount may further include a spring and a limit device. When the base frame is unfolded, the spring may be in a compressed state, and the limit device may limit the base frame to maintain in an unfolded state. When the base frame is folded, the spring may elongate.

In some embodiments, a push-pull handle may be disposed on the X-shaped hinged mount. The push-pull handle may be connected above a midpoint of the X-shaped hinged mount.

In some embodiments, the folding cart may further include: a communication device, at least one pressure sensor, and a processor. The at least one pressure sensor may be disposed on the base frame and may be configured to monitor pressure information of goods that the folding cart bears. The processor may be configured to obtain and analyze the pressure information monitored by the pressure sensor. The communication device may communicate with a user terminal and upload the information analyzed and processed by the processor to the user terminal.

In some embodiments, the processor may be configured to: determine alarm information by performing goods status analysis based on the obtained pressure information; and send an alarm to the user terminal based on the alarm information. The alarm information may include at least one of goods drop alarm information or goods anti-theft alarm information.

In some embodiments, the processor may be further configured to: identify a static pressure increase information sequence in a pressure information sequence, and determine a count and weight information of one or more goods in the folding cart; monitor a current pressure reduction in pressure change information when the folding cart moves; determine goods drop risk information based on the current pressure reduction in response to a determination that the current pressure reduction meets a preset change condition; and send the goods drop alarm information to the user terminal based on the goods drop risk information.

In some embodiments, the preset change condition may include that the current pressure reduction is greater than or equal to a first threshold, and the first threshold may be determined based on a minimum value in the static pressure increase information sequence and a mean value of the pressure change information when the folding cart moves.

In some embodiments, the processor may be further configured to: determine a location attribute of a current location of the user terminal based on positioning information of the user terminal, wherein the location attribute includes a secure region and a non-secure region; in response to a determination that the location attribute of the current location of the user terminal is the non-secure region, determine a positional relationship between the user terminal and the folding cart and a motion state of the folding cart based on a communication connection state between the communication device and the user terminal and a motion state of the user terminal; determine the goods anti-theft risk information based on the positional relationship between the user terminal and the folding cart, the motion state of the folding cart, and a change of the pressure information; and send the goods anti-theft alarm information to the user terminal based on the goods anti-theft risk information.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

Figure 1:
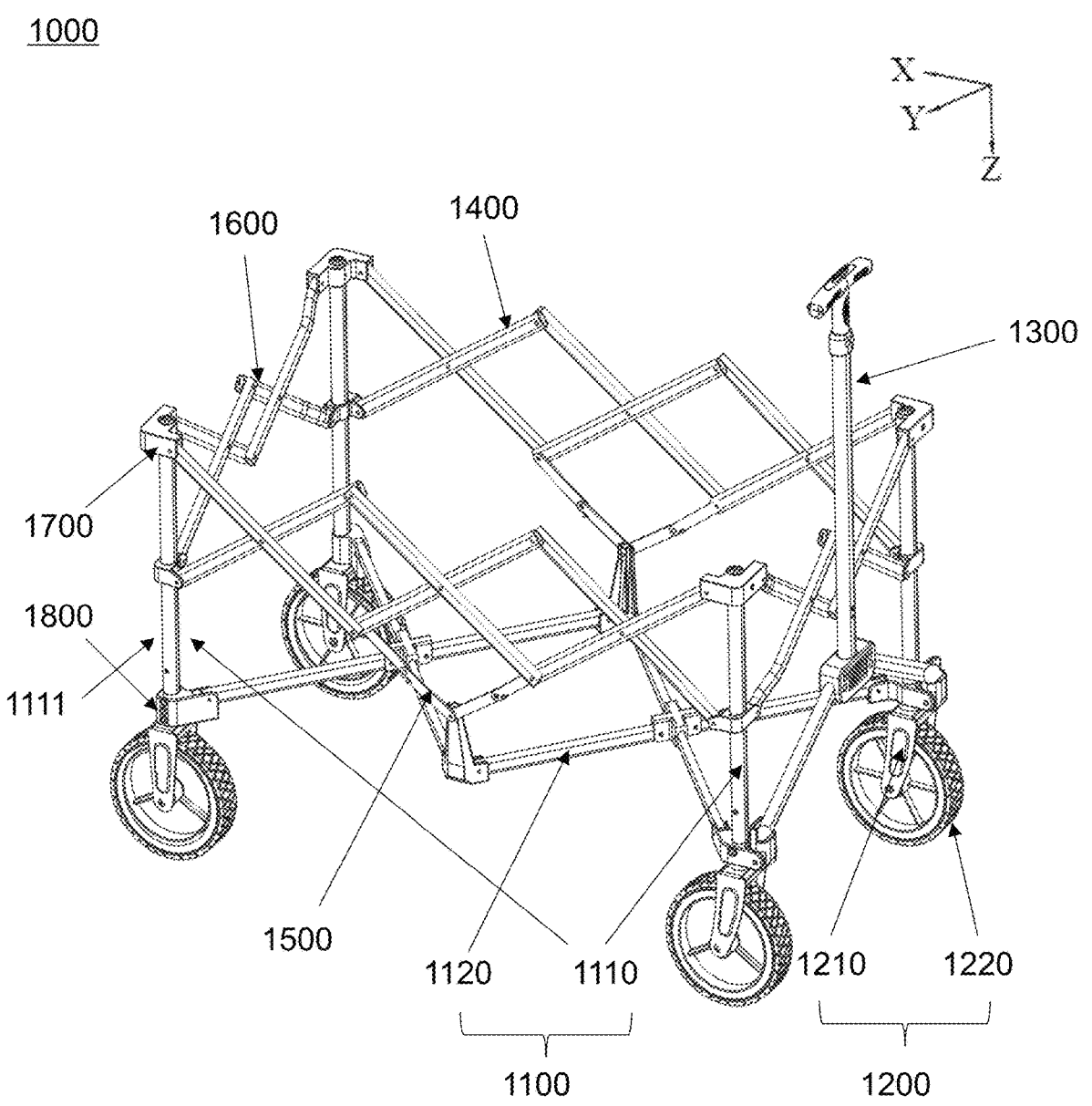
FIG. 1 is an axonometric view (a handrail assembly is in a vertical state) of a folding cart when the folding cart is unfolded according to some embodiments of the present disclosure.

In the figures: 1000, folding cart;

1100, cart frame assembly; 1110, support rod assembly; 1111, support rod; 1120, base frame; 1121, first hinged mount; 1122, second hinged mount; 1123, X-shaped hinged mount; 1123-1, spring; 1123-2, limit device; 1123-3, push-pull handle; 1124, hinged rod;

1200, wheel assembly; 1210, wheel seat; 1220, roller;

1300, handrail assembly; 1310, handrail rod; 1311, diagonal strut; 1312, vertical rod; 1313, connecting mount; 1314, handle; 1320, fixing mount; 1330, rotating connector;

1341, fixing mount; 1342, handrail cross rod; 1343, handrail vertical rod; 1344, universal adapter.

1400, first connecting part; 1410, first long rod; 1420, second long rod;

1500, second connecting part; 1510, first folding piece; 1511, groove; 1520, second folding piece; 1521, bending boss;

1600, third connecting part; 1610, first short rod; 1620, second short rod;

1700, fixing hinged mount; and 1800, sliding hinged mount.

DETAILED DESCRIPTION

The present disclosure is further illustrated in terms of exemplary embodiments. These exemplary embodiments are described in detail with reference to the drawings. When the following description relates to the drawings, same numerals in different drawings represent the same or similar elements unless otherwise indicated. The embodiments described in the following exemplary embodiments do not represent all embodiments consistent with the present disclosure. Rather, they are merely examples of devices and methods consistent with some aspects of the present disclosure as recited in the appended claims.

The terminology used in the present disclosure is merely for the purpose of describing particular embodiments, and is not intended to limit the present disclosure. As used in the present disclosure and the appended claims, the singular forms "a," "an," and "the" include plural referents as well, unless the context clearly dictates otherwise.

It should be understood that "first," "second," and similar words used in the present disclosure and claims do not indicate any order, quantity, or importance, but are only used to distinguish different components. Similarly, words like "a," or "one" do not denote a limitation in quantity, but indicate that there is at least one. Unless otherwise indicated, terms such as "front," "rear," "lower," and/or "upper" are used merely for convenience of illustration and are not intended to be limiting to a position or orientation in space. The terms "comprise," "comprises," and/or "comprising," "include," "includes," and/or "including," and similar terms mean that the elements or items listed before "comprise," "comprises," and/or "comprising," "include," "includes," and/or "including" cover the elements or items listed after "comprise," "comprises," and/or "comprising," "include," "includes," and/or "including" and equivalents thereof, and do not exclude other elements or items.

In daily life, it is often necessary to carry a lot of luggage. For example, it is necessary to carry a lot of equipments in scenarios such as camping and shopping, it is necessary to carry tents, tables, chairs, kitchenware, ingredients, etc., when going camping, and it is necessary to carry heavy items such as rice or oil when going shopping, which is a laborious thing if only relying on manual transportation. Therefore, a cart that can be folded and stored may save a lot of time and effort, and the folding cart occupies relatively small space for storage and is easy to carry.

The present disclosure provides a folding cart. The folding cart includes a cart frame assembly, a wheel assembly, and a handrail assembly. The cart frame assembly may have two states of folding and unfolding. The wheel assembly may be disposed at a lower end of the cart frame assembly to realize movement of the cart frame assembly. The handrail assembly may be disposed on the cart frame assembly, and the cart frame assembly may be driven to move through the handrail assembly under an action of an external force. The handrail assembly may be rotatably connected to the cart frame assembly to make the handrail assembly rotate at least on a first plane, so that when goods in the folding cart is relatively heavy or when the folding cart goes uphill, the handrail assembly may be rotated to a certain angle between the handrail assembly and the cart frame assembly, which can greatly reduce the risk of the handrail assembly being bent under an action of a relatively large external force.

It should be understood that the application scenarios of the folding cart in the present disclosure are only some examples or embodiments of the present disclosure, and those skilled in the art can also apply the present disclosure to other similar scenarios according to these drawings without making creative effort.

In some embodiments, a folding cart 1000 may include a cart frame assembly 1100, a wheel assembly 1200, and a handrail assembly 1300. The cart frame assembly 1100 may include a plurality of sets of support rod assemblies 1110 and a base frame 1120 hinged to lower ends of the support rod assemblies 1110. For one set of support rod assemblies, the one set of support rod assemblies 1110 may include at least two support rods 1111, and two adjacent support rods 1111 may be hinged through a first connecting part 1400 in the one set of support rod assemblies 1110. An upper end of the first connecting part 1400 may be fixedly hinged to the at least two support rods 1111, a lower end of the first connecting part 1400 may be slidingly hinged to the at least two support rods 1111, and the first connecting part 1400 and the base frame 1120 may be hinged through at least two second connecting part 1500. The first connecting part 1400 and the second connecting part 1500 may be folded along a first horizontal direction. Two support rods 1111 oppositely disposed on a same side in two adjacent sets of the plurality of support rod assemblies 1110 may be connected through a third connecting part 1600.

The cart frame assembly 1100 may be a main structure of the folding cart 1000. When the cart frame assembly 1100 is unfolded, the cart frame assembly 1100 may be a box-like storage body with an open upper end, and an internal holding chamber thereof may be used to carry goods. The cart frame assembly 1100 may be folded in a first direction (i.e., the X direction) and a second direction (i.e., the Y direction), so as to reduce a size of the folding cart 1000 for easy handling and storage.

The cart frame assembly is illustrated below by taking the cart frame assembly 1100 including two sets of support rod assemblies 1110 and one set of support rod assemblies 1110 including two support rods 1111 as an example.

Figure 2:
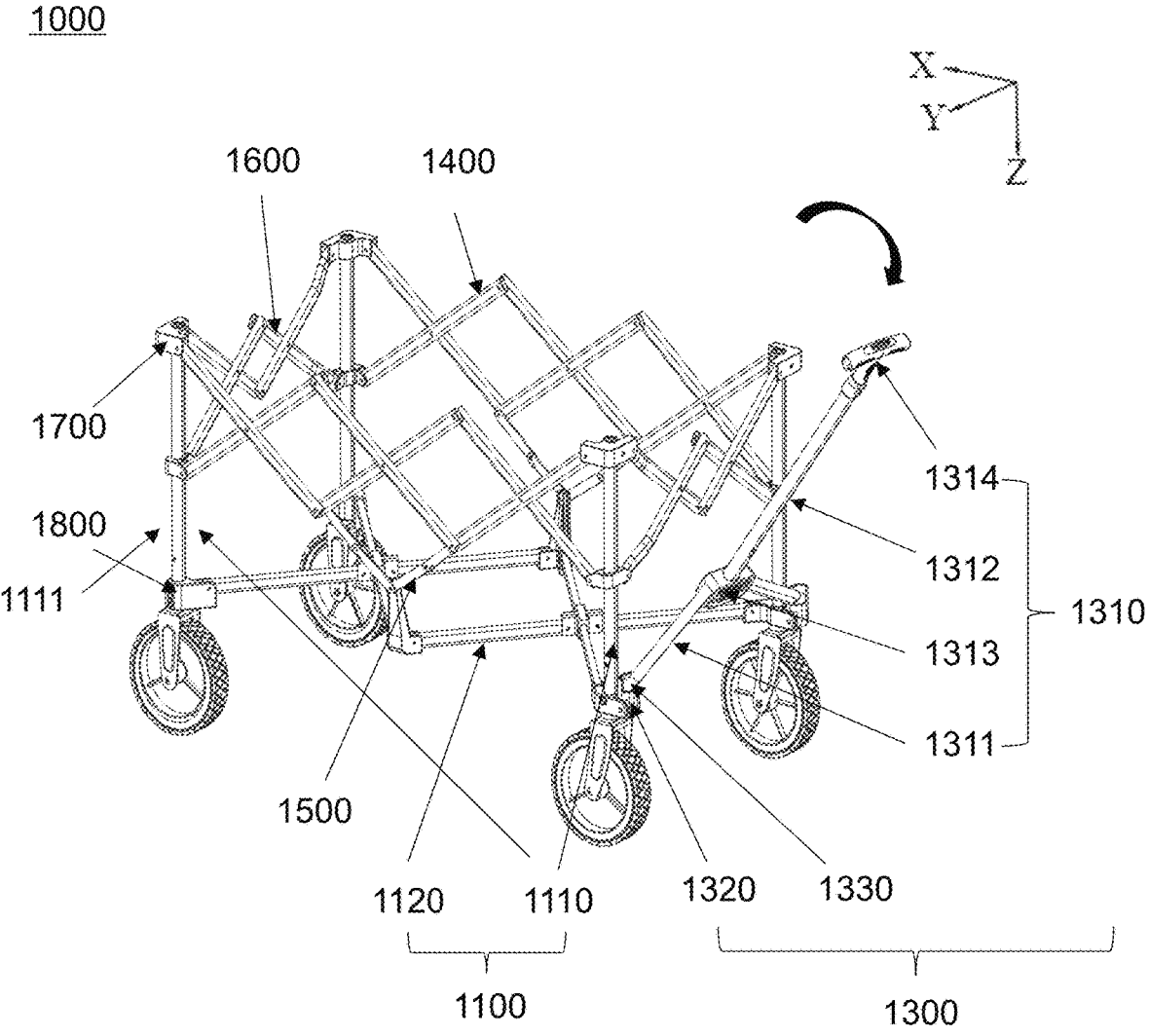
FIG. 2 is an axonometric view (a handrail assembly is in a rotational state) of a folding cart when the folding cart is unfolded according to some embodiments of the present disclosure.

Referring to FIG. 1 and FIG. 2, there may be four support rods 1111, and the base frame 1120 may be hinged to the lower ends of four support rods 1111. Two of the four support rods 1111 may be in a set and spaced along a second horizontal direction (i.e., the Y direction, which may also be a width direction of the folding cart 1000). The two support rods 1111 oppositely disposed on a same side in two sets of support rod assemblies 1110 are hinged through the third connecting parts 1600. The two support rods 1111 in each set of support rod assemblies 1110 may be hinged through the first connecting part 1400, the upper end of the first connecting part 1400 may be fixedly hinged to upper ends of the support rods 1111, and the lower ends of the first connecting part 1400 may be slidingly hinged to the support rods 1111.

When the folding cart is folded in a first horizontal direction (i.e., the X direction, which may also be a length direction of the folding cart 1000), the first connecting part 1400 may be shrunk and folded, a position of the upper end of the first connecting part 1400 relative to the upper ends of the support rods 1111 may not change, the lower end of the first connecting part 1400 may slide downward relative to the support rods 1111, and heights of the support rods 1111 may not change.

In some embodiments, in order to enhance the overall stability of the folding cart, a second connecting part 1500 may be disposed between the first connecting part 1400 and the base frame 1120, the second connecting part 1500 may be hinged between the first connecting part 1400 and the base frame 1120, and the second connecting part 1500 may also be folded along the first horizontal direction. In the structure, the base frame 1120 may be connected through the second connecting part 1500 in the case of increasing the unfolded size of the first connecting part 1400, thereby increasing the stability. When the folding cart is folded along the first horizontal direction, the first connecting part 1400 and the second connecting part 1500 may be shrunk and folded at the same time, and the first connecting part 1400 may not interfere with the wheel assembly 1200 while ensuring the overall length and stability of the folding cart.

In some embodiments, the support rods 1111 disposed on the same side in the two sets of support rod assemblies 1110 may be connected through the third connecting part 1600, and the two third connecting parts 1600 may be spaced along the first horizontal direction at a front end and a rear end of the folding cart 1000.

When the folding cart is folded, the first connecting part 1400 and the second connecting part 1500 may be folded along the first horizontal direction. When the first connecting part 1400 is folded, the lower end of the first connecting part 1400 may move toward the lower ends of the support rods 1111 without changing the lengths of the support rods 1111, so that the overall height of the folding cart 1000 may not change when the folding cart 1000 is folded and stored.

In some embodiments, the folding cart 1000 may include not only two sets of support rod assemblies 1110, but also more sets of support rod assemblies 1110. A specific count of sets of support rod assemblies 1110 disposed on the folding cart 1000 may be set according to the length of the folding cart 1000 when the folding cart 1000 is unfolded. If a dimension of the unfolded folding cart 1000 in a length direction is relatively large, in order to improve a structural stability of the entire cart, more than two sets of support rod assemblies 1110 may be provided.

In some embodiments, a set of support rod assemblies 1110 may also include more than two support rods 1111. A specific count of support rods 1111 disposed in each set of support rod assembly 1110 may be set according to a width of the folding cart 1000 when the folding cart 1000 is unfolded. If a dimension of the unfolded folding cart 1000 in a width direction is relatively large, in order to improve the structural stability of the entire cart, more than two support rods 1111 may be provided.

The wheel assembly 1200 may be disposed at a lower end of the cart frame assembly 1100 to realize movement of the cart frame assembly 1100.

In some embodiments, the wheel assembly 1200 may include at least four wheel seats 1210 and at least four rollers 1220. At least one wheel seat 1210 and at least one roller 1220 may be respectively mounted on four corners of a bottom end of the cart frame assembly 1100.

Taking the wheel assembly 1200 including four wheel seats 1210 and four rollers 122 as an example, as shown in FIG. 1 and FIG. 2, the four wheel seats 1210 may be fixedly disposed on bottom ends of the four support rods 1111, respectively, and the four rollers 1220 may be rotatably disposed on the four wheel seats 1210, respectively. The four rollers 1220 may facilitate the movement of the folding car 1000.

In some embodiments, the plurality of rollers 1220 of the wheel assembly 1200 may be universal wheels, which may facilitate steering when the folding cart 1000 moves. In some embodiments, two rollers 1220 that are close to the handrail assembly 1300 of the wheel assembly 1200 may be universal wheels, and the remaining rollers 1220 may be straight wheels, so that people may better control steering of the folding cart 1000 through the handrail assembly 1300 when the folding cart 1000 moves.

In some embodiments, a count of wheel seats 1210 and a count of rollers 1220 in the wheel assembly 1200 may be equal to a count of support rods 1111, i.e., a set of wheel seat 1210 and roller 1220 may be connected to a lower end of each support rod 1111. For example, when the folding cart 1000 includes six support rods 1111, six sets of corresponding wheel seats 1210 and rollers 1220 may be provided.

The handrail assembly 1300 may be disposed on the cart frame assembly 1100, and the cart frame assembly 1100 may be driven to move through the handrail assembly 1300 under an action of an external force. The handrail assembly 1300 may be rotatably connected to the cart frame assembly 1100 to make the handrail assembly 1300 rotate at least on a first plane (i.e., the XZ plane).

In some embodiments, an initial state of the handrail assembly 1300 may be a vertical state. That is, the handrail assembly 1300 may be parallel to the support rods 1111, and the folding cart 1000 in the state may be suitable for moving on a horizontal ground. When the ground has a certain slope, if the handrail assembly 1300 is still in the vertical state, the handrail assembly 1300 may have a limited force range when pushed by an external force, and the handrail assembly 1300 may be prone to bending. Therefore, when the ground has a certain slope, the handrail assembly 1300 may be rotated on the first plane to form a certain angle between the handrail assembly 1300 and the cart frame assembly 1100 to adapt to the slope of the ground, which can greatly reduce a risk of the handrail assembly 1300 to be bent.

In some embodiments, the handrail assembly 1300 may be disposed at one end of the cart frame assembly 1100 in a length direction, and a user may easily push or pull the folding cart 1000 to move through the handrail assembly 1300. The first plane refers to the XZ plane in FIG. 1, which may be specifically understood as a vertical plane passing through a center of the cart frame assembly 1100 in a width direction and parallel to the length direction of the cart frame assembly 1100.

In some embodiments, as shown in FIG. 2, the handrail assembly 1300 includes a handrail rod 1310, at least one fixing mount 1320, and at least one rotating connector 1330. The fixing mount 1320 may be fixedly connected to the cart frame assembly 1100, and the handrail rod 1310 may be rotatably connected to the fixing mount 1320 through the rotating connector 1330 to make the handrail rod 1310 rotate around the fixing mount 1320 at least on the first plane (i.e., the XZ plane).

The handrail rod 1310 may be used to facilitate the user to push or pull the folding cart 1000 to move, thereby improving the convenience of using the folding cart 1000. The force exerted by the user on the handrail rod 1310 may be transmitted to the wheel assembly 1200 through the handrail rod 1310 to realize the movement of the folding cart 1000.

The fixing mount 1320 may be fixedly connected to the cart frame assembly 1100 for connecting the handrail assembly 1300 to the cart frame assembly 1100 and transmitting the external force received by the handrail assembly 1300 to the wheel assembly 1200. In some embodiments, two fixing mounts 1320 may be provided, which may be fixedly connected to a same set of two opposite support rods 1111, respectively. In order to better convert the external force into a driving force of the wheel assembly 1200, the two fixing mounts 1320 may be fixedly connected to sides of the two support rods 1111 near a bottom end, respectively. It may also be understood that the fixing mounts 1320 may be disposed close to the wheel assembly 1200.

In some embodiments, a rotation direction of the handrail rod 1310 on the first plane may be from a state where the handrail rod 1310 is parallel to the support rods 1111 to a state where the handrail rod 1310 is away from the support rods 1111 and the rotation direction has an angle with the support rods 1111 on the first plane (i.e., the XZ plane). That is, the handrail rod 1310 may only rotate outward (i.e., away from the cart frame assembly 1100), but may not rotate inward. For example, when the folding cart 1000 goes up and downhill, the handrail rod 1310 may not only adapt to the slope of the ground but also a height of the user after being rotated on the first plane, so that the user may push or pull the folding cart 1000 in a comfortable and labor-saving way.

In some embodiments, referring to FIG. 1 and FIG. 2, the handrail rod 1310 may include a diagonal strut 1311, a vertical rod 1312, and a connecting mount 1313. In some embodiments, two diagonal struts 1311 may be provided. One end of each of the two diagonal struts 1311 may be fixedly connected to the vertical rod through the connecting mount 1313, and another end of each of the two diagonal struts 1311 may be rotationally connected to the two fixing mounts 1320 through the two rotating connectors 1330 of the at least one rotating connector, respectively. The connecting mount 1313 may be connected between the vertical rod 1312 and the two diagonal struts 1311, and the handrail rod 1310 may form an inverted Y-shaped structure. The two fixing mounts 1320 may be symmetrically fixed on the two support rods 1111 in the one set of support rod assemblies 1110. In this embodiment, it should be noted that when the folding cart 1000 is folded, the handrail assembly 1300 may also be folded at the same time. That is, the two support rods 1111 may be merged toward each other. Therefore, the rotating connectors 1330 may be universal balls, and the universal balls may rotate in a universal direction relative to the fixing mounts 1320.

In some embodiments, the two fixing mounts 1320 may be disposed on the two first hinged mounts 1210, and descriptions about the first hinged mounts 1210 is illustrated below.

In some embodiments, the handrail rod 1310 may further include a handle 1314 disposed on a top of the vertical rod 1312, so that the user can hold the handle 1314 to push or pull the folding cart 1000 more easily and comfortably.

Figure 3:
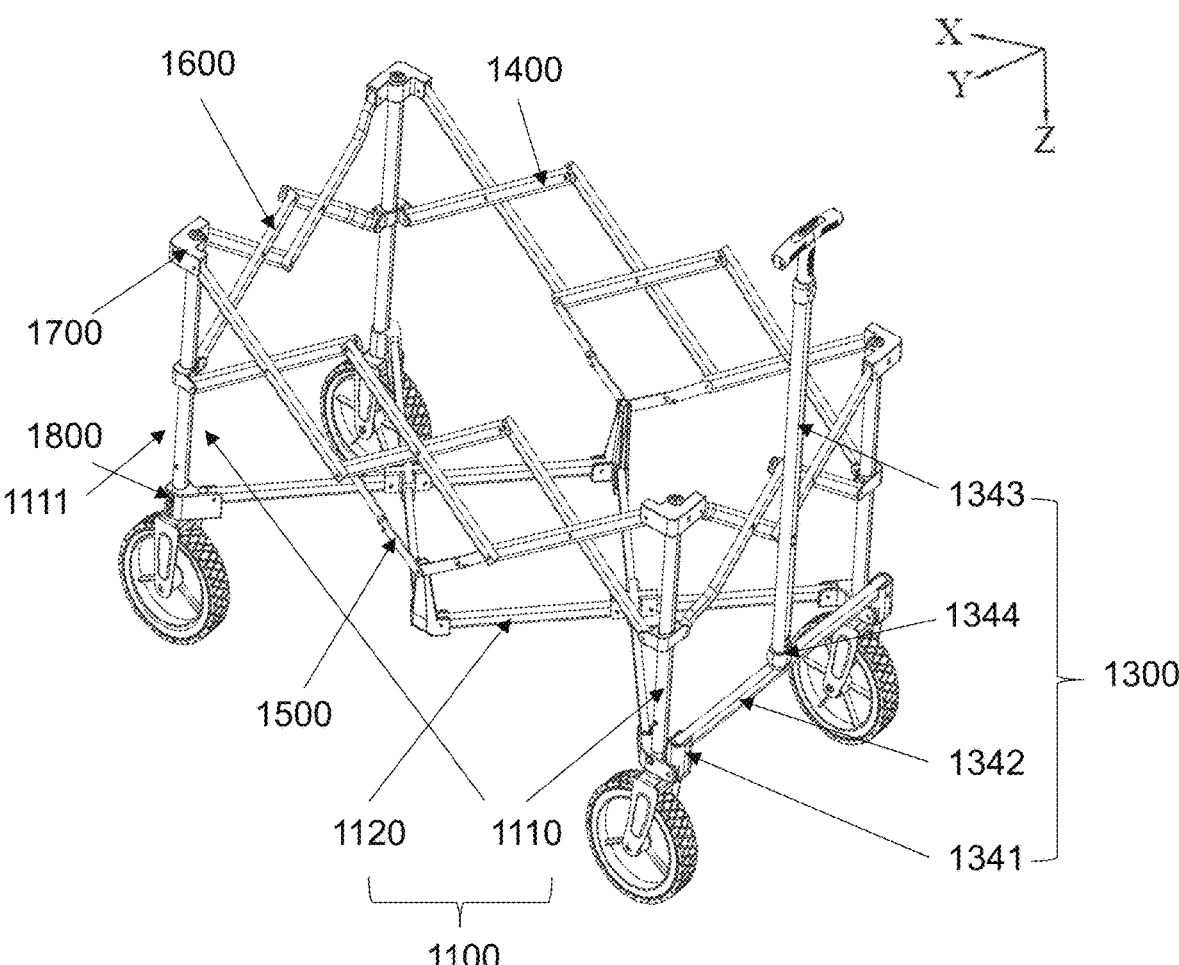
FIG. 3 is an axonometric view (a handrail assembly is in a vertical state) of a folding cart when the folding cart is unfolded according to other embodiments of the present disclosure.
Figure 4:
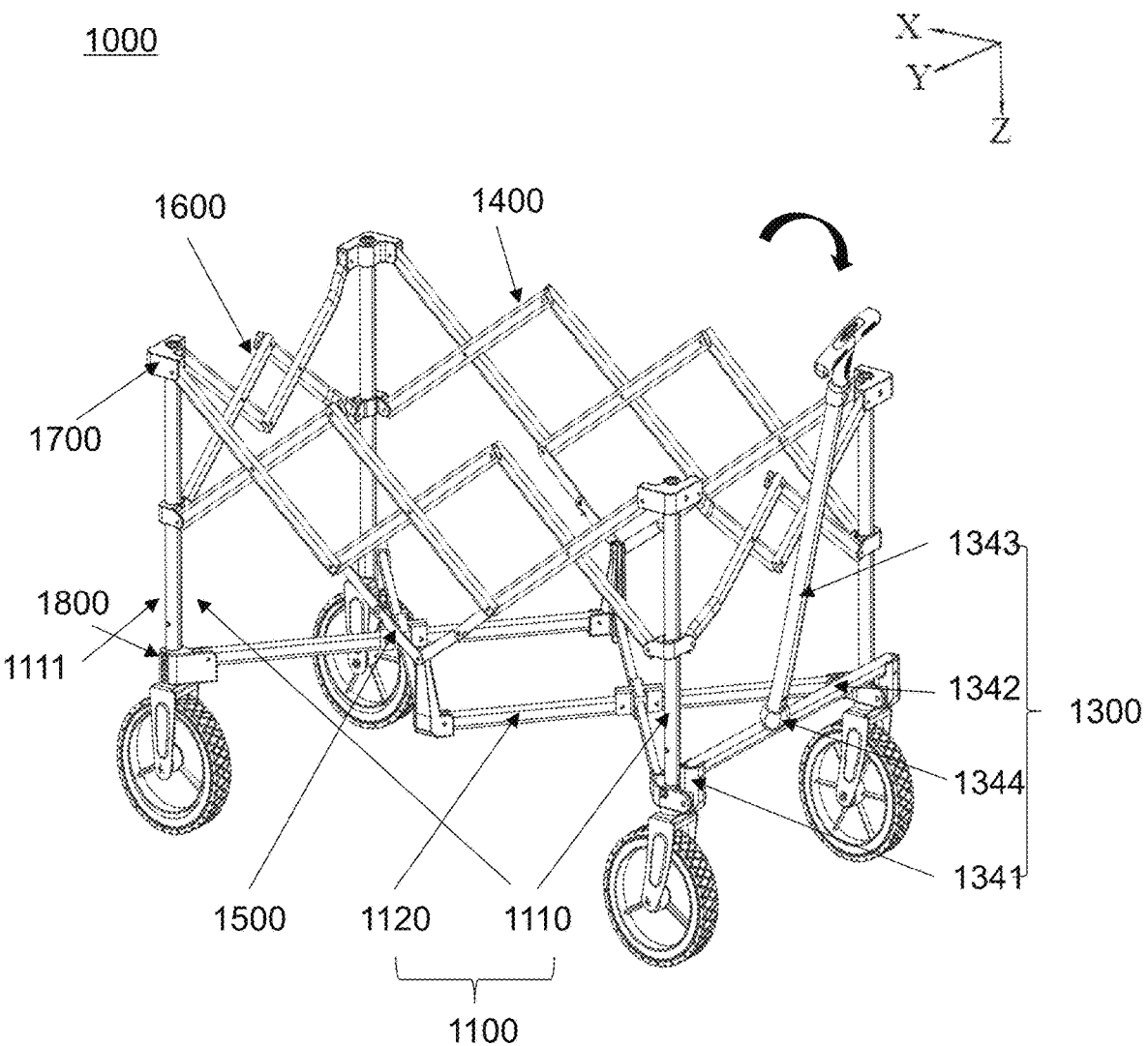
FIG. 4 is an axonometric view (a handrail assembly is in a rotational state) of a folding cart when the folding cart is unfolded according to other embodiments of the present disclosure.

In some embodiments, referring to FIG. 3 and FIG. 4, the handrail assembly 1300 may include at least one fixing mount 1341, a handrail cross rod 1342, a handrail vertical rod 1343, and a universal adapter 1344. In some embodiments, two fixing mounts 1341 may be provided, and the two fixing mounts 1341 may be fixedly connected to the cart frame assembly 1100. In some embodiments, the two fixing mounts 1341 may be fixedly connected to a same set of two opposite support rods 1111, respectively. Two ends of the handrail cross rod 1342 may be fixedly connected to the two fixing mounts 1341. The handrail vertical rod 1343 may be rotatably connected to the handrail cross rod 1342 through the universal adapter 1344 to make the handrail vertical rod rotate around the universal adapter at least on the first plane and/or a second plane.

The second plane refers to the YZ plane in FIG. 3, and the second plane is perpendicular to the first plane. The second plane may refer to as a vertical plane passing through the universal adapter 1344 and being parallel to the width direction of the cart frame assembly 1100.

In some embodiments, the universal adapter 1344 may be disposed at a midpoint of the handrail cross rod 1342, and the handrail cross rod 1342 and the handrail vertical rod 1343 may form an inverted T-shaped structure. When the user exerts a force on the handrail vertical rod 1343, the force may be evenly transmitted to the wheel assembly 1200 through the handrail cross rod 1342.

In some embodiments, the handrail cross rod 1342 may include two handrail cross rods symmetrical to each other, which are hinged on two sides of the universal adapter 1344 along a horizontal direction. When the folding cart 1000 needs to be folded, the handrail assembly 1300 may also be folded at the same time. That is, the two handrail cross rods 1342 may be merged toward each other to achieve the folding of the handrail assembly 1300.

In some embodiments, the universal adapter 1344 may be used to connect the handrail cross rod 1342 and the handrail vertical rod 1343. Through the connection of the universal adapter 1344, the handrail vertical rod 1343 may be rotated around the universal adapter 1344 at least on the first plane (i.e., the XZ plane) and/or the second plane (i.e., the YZ plane). It may be understood that the handrail vertical rod 1343 may be turned outward relative to the cart frame assembly 1100, and may be turned left and right to more conveniently manipulate the cart frame assembly 1100 for steering.

In some embodiments, the universal adapter 1344 may be a ball rotary joint. A rotation direction of the handrail vertical rod 1343 on the first plane and/or the second plane may be from a state where the handrail vertical rod 1343 is parallel to the support rods 1111 to a state where the handrail vertical rod 1343 is away from the support rods 1111 and the rotation direction has an angle with the support rods 1111 on the first plane and/or the second plane.

In some embodiments, the ball rotary joint 1344 may be provided with a self-locking device, and the self-locking device may be used to lock the handrail vertical rod 1343 on the handrail cross rod 1342. For example, when the folding cart 1000 does not need to move (a stationary state such as loading and unloading), in order to prevent the handrail vertical rod 1343 from rotating and causing danger (e.g., bumping into people, breaking objects, etc.), the self-locking device may be used to lock the handrail vertical rod 1343 on the handrail cross rod 1342. As another example, when the folding cart 1000 is folded and stored, the handrail vertical rod 1343 may also be locked on the handrail cross rod 1342 by the self-locking device, so as to prevent the handrail vertical rod 1343 from rotating and causing certain danger when the folded folding cart 1000 is transported.

Figure 7:
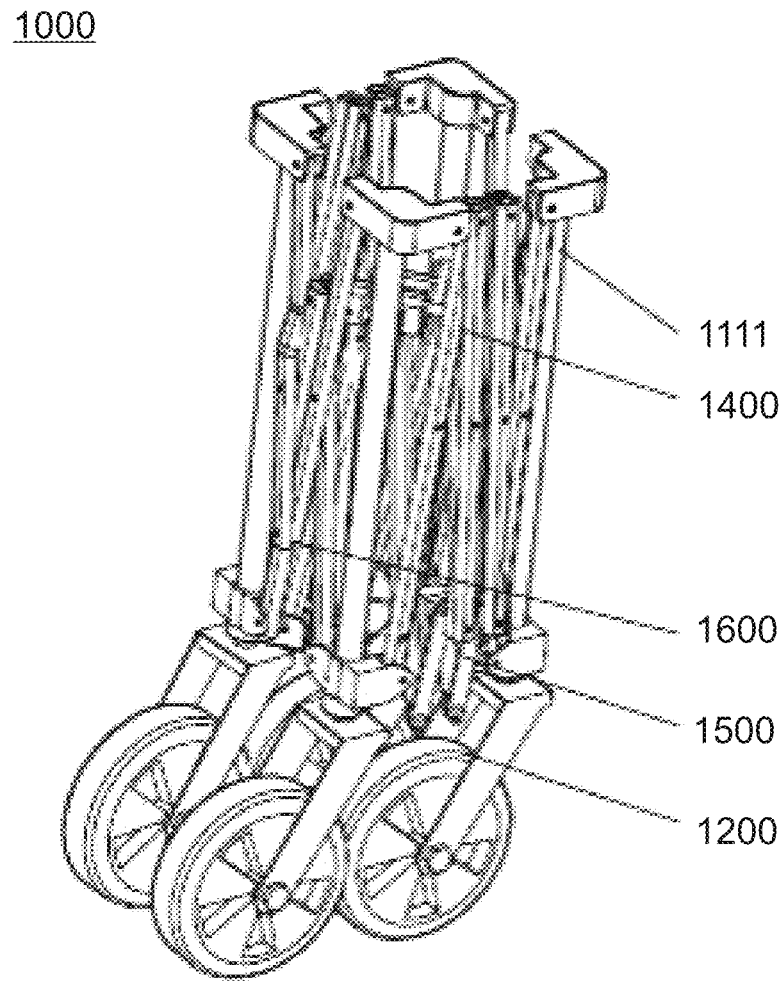
FIG. 7 is an axonometric view of a folding cart when the folding cart is folded according to some embodiments of the present disclosure.

In some embodiments, the third connecting part 1600 may be hinged between the two support rods 1111 disposed on the same side in the two sets of support rod assemblies 1110, an upper end of the third connecting part 1600 may be fixedly hinged to the support rods 1111 disposed on the same side, a lower end of the third connecting part 1600 may be slidingly hinged to the support rods 1111 disposed on the same side, the third connecting part 1600 may be folded along the second horizontal direction, and the base frame 1120 may be folded along the vertical direction (i.e. the Z direction). Referring to FIG. 7, the structure mentioned above realizes the lateral and longitudinal shrinkage of the folding cart 1000, which effectively reduces the occupied space and facilitates transportation and storage.

Figure 5:
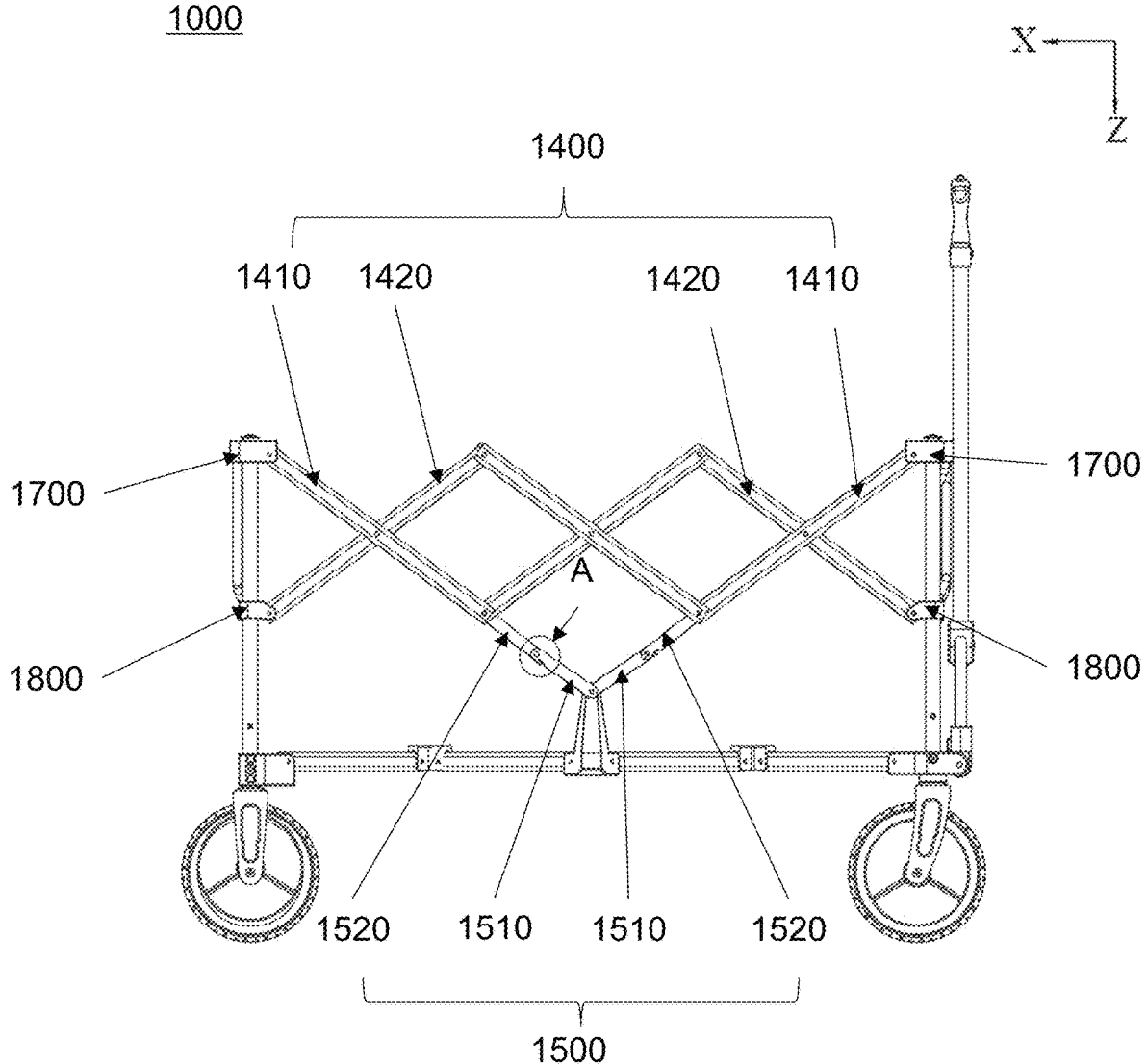
FIG. 5 is a front view of a folding cart when the folding cart is unfolded according to some embodiments of the present disclosure.
Figure 8:
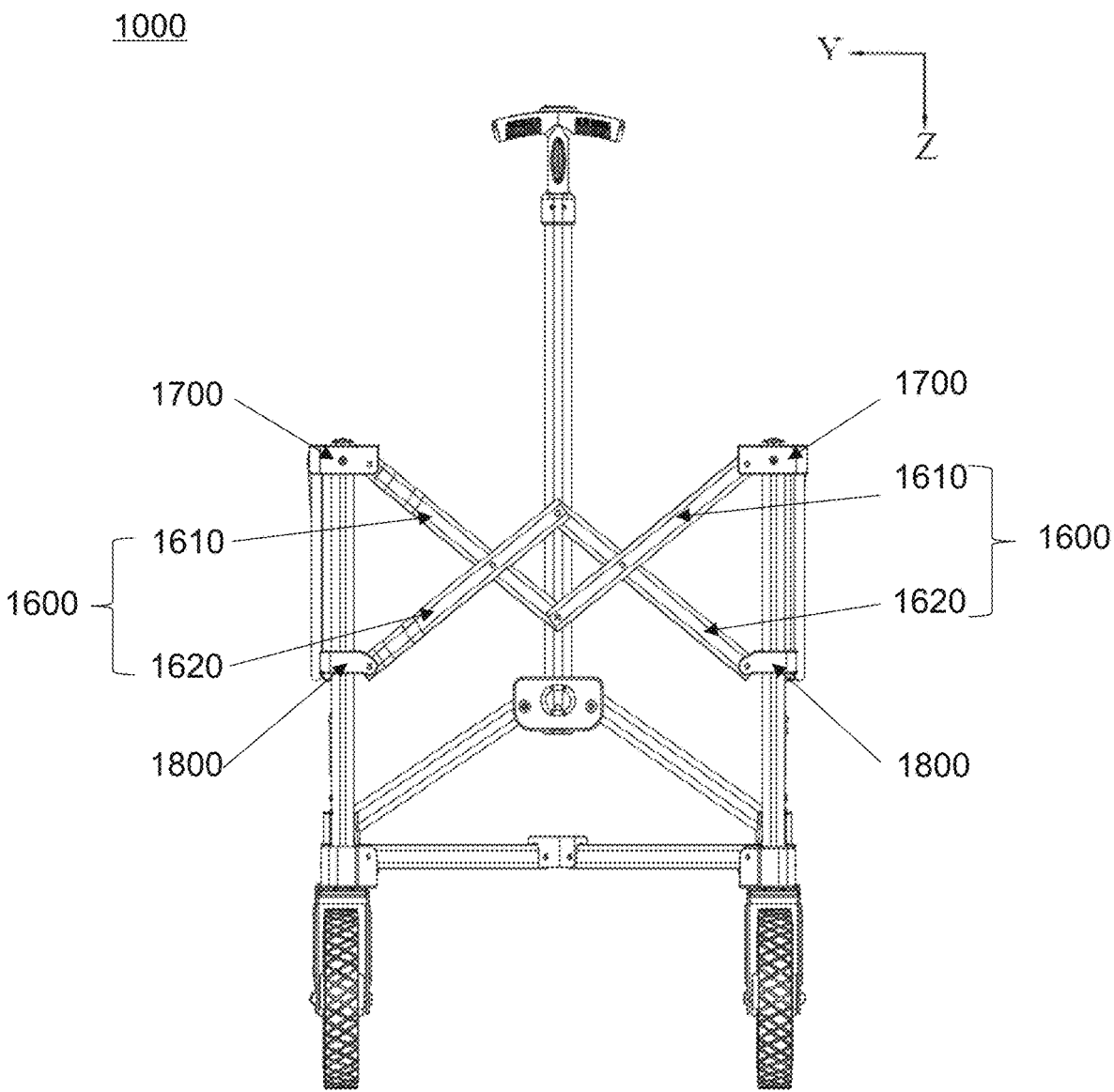
FIG. 8 is a side view of a folding cart when the folding cart is unfolded according to some embodiments of the present disclosure.

In some embodiments, as shown in FIG. 5 and FIG. 8, an upper end of the support rod(s) 1111 disposed on the same side may be fixedly provided with a fixing hinged mount 1700, the support rod(s) 1111 disposed on the same side may be slidably sleeved with a sliding hinged mount 1800 along an axis direction of the support rod(s) 1111 disposed on the same side, the upper ends of the first connecting part 1400 and third connecting part 1600 may be hinged to the fixing hinged mount 1700, and the lower ends of the first connecting part 1400 and the third connecting part 1600 may be hinged to the sliding hinged mount 1800. Therefore, the connection structures of the first connecting part 1400 and the third connecting part 1600 may be more reasonable, and when the folding cart 1000 is folded, the first connecting part 1400 and the third connecting part 1600 may be folded simultaneously to increase the folding speed.

In some embodiments, referring to FIG. 5, the first connecting part 1400 may include a plurality of mutually hinged long rod hinged sets. For each long rod hinged set, the long rod hinged set(s) may include a first long rod 1410 and a second long rod 1420 that are mutually hinged and distributed in an X-shape. The plurality of hinged long rod sets may be scissor structures. Outer ends of two first long rods 1410 in two long rod hinged sets located on an outermost side may be respectively hinged to two fixing hinged mounts 1700. Outer ends of two second long rods 1420 in the two long rod hinged sets located on the outermost side may be respectively hinged to two sliding hinged mounts 1800. The second connecting part 1500 may be hinged between the base frame 1120 and a long rod hinged set located in a middle of the plurality of mutually hinged long rod hinged sets.

The second connecting part 1500 may be used to connect the first connecting part 1400 and the base frame 1120, which may make the structure of the folding cart 1000 in the unfolded state more stable and have a greater bearing capacity.

In some embodiments, referring to FIG. 5, there may be three long rod hinged sets, and the three long rod hinged sets may be mutually hinged. The position distribution of the first long rod 1410 and the second long rod 1420 may be more reasonable.

In some embodiments, referring to FIG. 8, the third connecting part 1600 may include a plurality of mutually short rod sets. For each short rod hinged set, the short rod hinged set(s) may include a first short rod 1610 and a second short rod 1620 that are mutually hinged and distributed in an X-shape. Outer ends of two first short rods 1610 in two short rod hinged sets located on an outermost side may be respectively hinged to two fixing hinged mounts 1700. Outer ends of two second short rods 1620 in the two short rod hinged sets located on the outermost side may be respectively hinged to two sliding hinged mounts 1800. Continuing to refer to FIG. 8, two short rod hinged sets may be provided. The first short rod 1610 and the second short rod 1620 in each set may be hinged to each other in an X-shape distribution. Two ends of one end of the two first short rods 1610 in the two short rod hinged sets may be hinged to each other, and two ends of another end of the two first short rods 1610 in the two short rod hinged sets may be respectively hinged to the fixing hinged mounts 1700. Two ends of one end of two second short rods 1620 may be hinged to each other, and two ends of another end of the two second short rods 1620 may be respectively hinged to the sliding hinged mounts 1800. In order to ensure convenient assembly and reasonable structural design, the first short rod 1610 and the second short rod 1620 in one short rod hinged set located at one end of the folding cart may be configured as bending rods.

In some embodiments, a mutual hinge point of the first short rod 1610 and the second short rod 1610 in each short rod hinged set may be disposed away from the support rod 1111, which may be conducive to increasing an unfolding distance of the folding cart 1000 along the second horizontal direction when the folding cart 1000 is unfolded.

Figure 6:
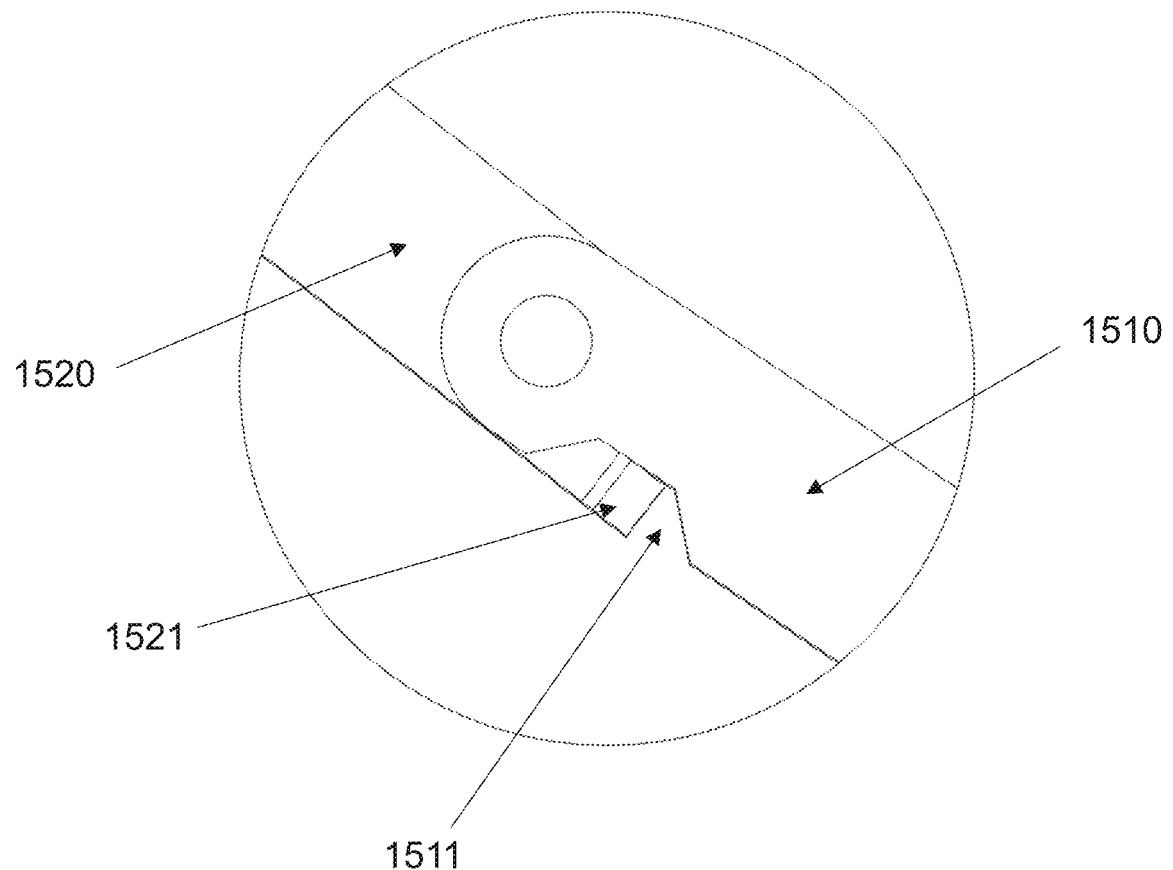
FIG. 6 is an enlarged view of a structure at A in FIG. 5.

In some embodiments, referring to FIG. 5 and FIG. 6, the second connecting part 1500 may include two first folding pieces 1510 and two second folding pieces 1520. Each of the two first folding pieces 1510 and each of the two second folding pieces 1520 may be hinged with each other, and one end of each of the two first folding pieces 1510 away from the first connecting part 1400 may be hinged and at the same time hinged to the base frame 1120, and one end of each of the two second folding pieces 1520 away from the base frame 1120 may be respectively hinged to one set of the first long rod 1410 and the second long rod 1420 that are mutually hinged and in a middle position of the first connecting part 1400. For example, when the first connecting part 1400 includes three long rod hinged sets, the one end of each of the two second folding pieces 1520 away from the base frame 1120 may be respectively hinged to a middle set of the first long rod 1410 and the second long rod 1420 that are mutually hinged. In the structure mentioned above, when the folding cart is folded along the first horizontal direction, the first folding piece(s) 1510 and the second folding piece(s) 1520 may be folded mutually to shrink.

In some embodiments, referring to FIG. 6, in order to prevent the first folding piece(s) 1510 and the second folding piece(s) 1520 from unfolding excessively, one end of the first folding piece(s) 1510 near the second folding piece(s) 1520 may be provided with a groove 1511, and one end of the second folding piece(s) 1520 near the first folding piece 1510 may be provided with a bending boss 1521. When the folding cart is unfolded, the first folding piece(s) 1510 and the second folding piece(s) 1520 may be opened to a predetermined degree, and the bending boss 1521 may be limited in the groove 1511.

Figure 9:
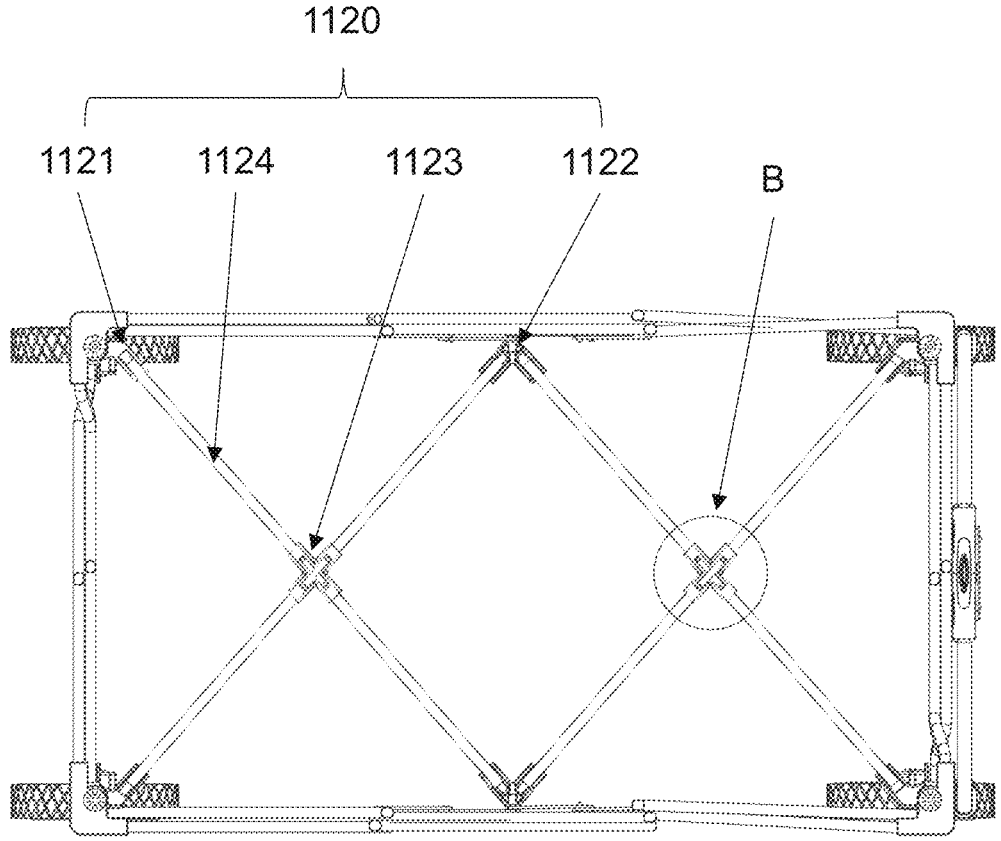
FIG. 9 is a top view of a folding cart when the folding cart is unfolded according to some embodiments of the present disclosure.

In some embodiments, referring to FIG. 9, the base frame 1120 may include four first hinged mounts 1121, two second hinged mounts 1122, and two sets of hinged frames. The four first hinged mounts 1121 may be respectively fixed on four support rods 1111 in the two adjacent sets of the plurality of sets of support rod assemblies. The two second hinged mounts 1122 may be respectively connected to lower ends of the two second folding pieces 1510 of the two second connecting parts 1500. One set of hinged frames may be hinged between the two first hinged mounts 1121 of the four first hinged mounts and one end of the two second hinged mounts 1122. Another set of hinged frames may be hinged between another two first hinged mounts 1121 of the four first hinged mounts and another end of the two second hinged mounts 1122. The two sets of hinged frames may be folded along the vertical direction. In the structure mentioned above, the base frame 1120 may be composed of the two sets of hinged frames connected by the four first hinged mounts 1121 and the two second hinged mounts 1122. The force received by the base frame 1120 may be balanced and dispersed, which can improve the overall strength of the folding cart 1000 in the unfolded state.

In some embodiments, one set of hinged frames may include an X-shaped hinged mount 1123 and four hinged rods 1124 whose ends are hinged to the X-shaped hinged mount 1123. Axes of two of the four hinged rods 1124 may coincide with each other and the four hinged rods 1124 may be divided into two sets. Two sets of hinged rods 1124 may be distributed in an X-shape. Two ends of two hinged rods 1124 in one set away from the X-shaped hinged mount 1123 may be respectively hinged between one first hinged mount

1121 and one second hinged mount 1122. Two ends of the two hinged rods 1124 in another set away from the X-shaped hinged mount 1123 may be respectively hinged between another first hinged mount 1121 and another second hinged mount 1122. By pulling two X-shaped hinged mounts 1123 upwards in the vertical direction, eight hinged rods 1124 in the two sets of hinged frames may swing upwards at the same time, so as to realize the shrinkage and folding of the folding cart. The structure mentioned above can make the folding cart have a high overall strength when the cart is unfolded, which is easy to shrink and fold.

Figure 10:
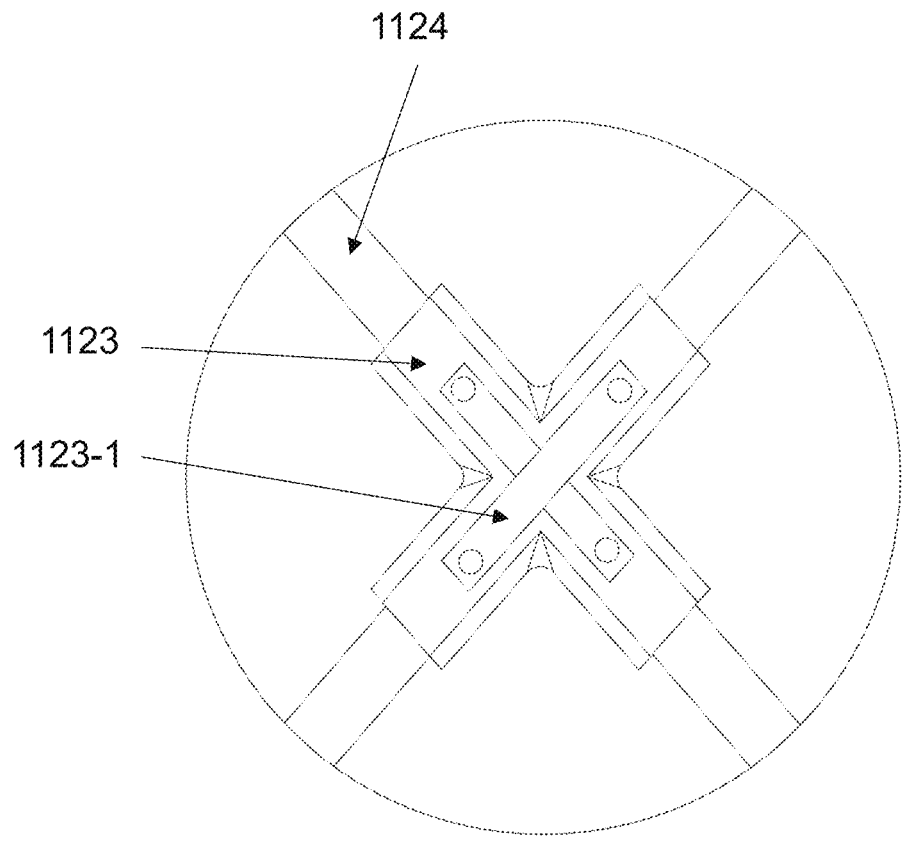
FIG. 10 is a top view of an X-shaped hinged mount of a folding cart when the X-shaped hinged mount is unfolded according to some embodiments of the present disclosure.
Figure 11:
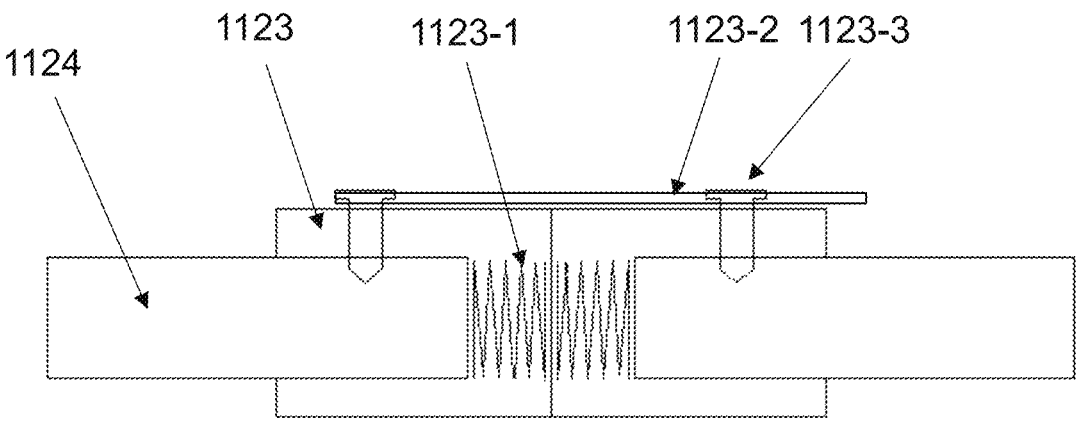
FIG. 11 is a structural schematic diagram illustrating a set of hinged mounts whose central axes coincide with X-shaped hinged mounts when a folding cart is unfolded according to some embodiments of the present disclosure.
Figure 12:
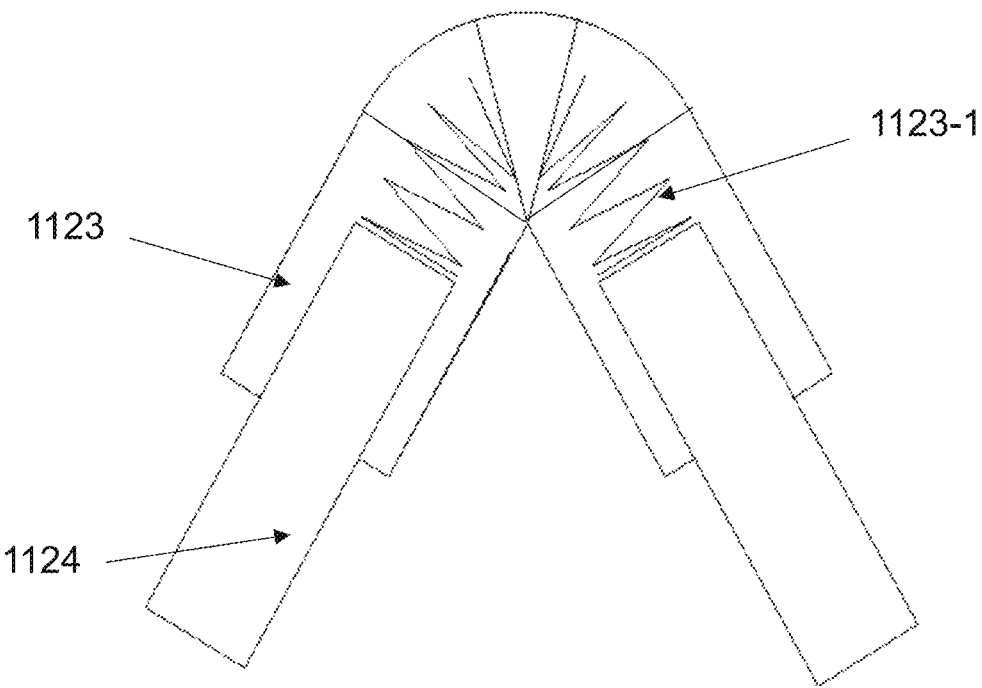
FIG. 12 is a structural schematic diagram illustrating a set of hinged mounts whose central axes coincide with X-shaped hinged mounts when a folding cart is folded according to some embodiments of the present disclosure.

In some embodiments, referring to FIGS. 10-12, the X-shaped hinged mount 1123 may further include a spring 1123-1 and a limit device 1123-2. The spring 1123-1 may be in a compressed state (as shown in FIG. 11) when the base frame 1120 is unfolded, and the limit device may limit the base frame 1120 to maintain in an unfolded state. The spring 1123-1 may elongate naturally when the base frame 1120 is folded, so that the user may fold the base frame 1120 more easily with less force.

In some embodiments, the limit device may include a screw, a pin, etc. Referring to FIG. 10, the limit device may be four pins, and the four pins may respectively define four hinged rods 1124 in the unfolded state. Since the spring 1123-1 is in the compressed state when the base frame 1120 is unfolded, in order to prevent the base frame 1120 from automatically folding under the elastic force of the spring 1123-1, the limit device may need to be installed on the X-shaped hinged mount 1123.

In some embodiments, referring to FIG. 10, at least two of the four pins may be fixedly connected with each other, and one set of pins may be used to fix a set of hinged rods 1124 whose axes coincide with each other. The two sets of pins may be disposed in an X shape. Pin holes for mounting pins may be disposed on the X-shaped hinged mount 1123 and the hinged rods 1124. After two X-shaped pin sets are installed on the X-shaped hinged mount 1123, the four hinged rods 1124 may be limited to be X-shaped, so as to realize the structural stability of the folding cart 1000 in the unfolded state. When the folding cart 1000 is to be folded, the four pins may need to be removed to release the position limit on the four hinged rods 1124.

In some embodiments, the four pins may be fixedly connected together by a rectangular frame, so that the four pins may be quickly installed at the same time, and may also be removed at the same time, thereby saving time and effort.

The limit device 1123-2 may be disposed on the X-shaped hinged mount 1123, so that when the folding cart 1000 is in the unfolded state, the relative positions of the four hinged rods 1124 limited by the limit device 1123-2 may be stable, the base frame 1120 may be more stable, and the overall structural stability of the folding cart 1000 can be improved, thereby increasing the carrying capacity of the folding cart 1000. The spring 1123-1 may be disposed inside the X-shaped hinged mount 1123, so that the spring 1123-1 may be in the compressed state when the base frame 1120 is unfolded, the spring 1123-1 may elongate naturally when the limit of the limit device 1123-2 is released under an action of an external force, and the user may achieve the folding of the base frame 1120 using less force.

In some embodiments, a push-pull handle 1123-3 may be disposed on the X-shaped hinged mount 1123, and the push-pull handle 1123-3 may be connected above a midpoint of the X-shaped hinged mount 1123. When the folding cart 1000 needs to be folded, the user may first release the limit device 1123-2 and pull a middle part of the X-shaped hinged mount 1123 upwards through the push-pull handle 1123-3, so that the middle part of the X-shaped hinged mount 1123 may go up and the four corners of the X-shaped hinged mount 1123 may go down to realize the folding of the base frame 1120.

In some embodiments, a lower end of the limit device 1123-2 and the X-shaped hinged mount 1123 may be connected by a cloth belt (or chain), and the limit device and the cloth belt (or chain) may form the push-pull handle 1123-3. When the limit device is released, the base frame 1120 may be quickly folded by continuously applying upward pulling force to the limit device 1123-2.

In some embodiments of the present disclosure, the limit device may be used as a portion of the push-pull handle 1123-3, so that parts may be more simplified. When the limit device 1123-2 is released, the base frame 1120 may be folded at the same time, and the limit device 1123-4 may be connected with the X-shaped hinged mount 1123, which may effectively prevent the limit device 1123-2 from being lost during disassembly and assembly.

As shown in FIG. 7, when the folding cart 1000 is in the folded state, the base frame 1120 may be folded in the vertical direction, the first connecting part 1400 and the second connecting part 1500 may be folded along the first horizontal direction, and the third connecting part 1600 may be folded along the second horizontal direction, so that the space occupied by the folding cart 1000 may be relatively small, which is convenient for transportation and storage.

In some embodiments, the folding cart 1000 may also include a communication device, at least one pressure sensor, and a processor. The at least one pressure sensor may be disposed on the base frame and may be configured to monitor pressure information 2110 of goods that the folding cart 1000 bears. The processor may be configured to obtain and analyze the pressure information 2110 monitored by the pressure sensor. The communication device may communicate with a user terminal and upload the information analyzed and processed by the processor to the user terminal.

The communication device may be used to receive and transmit information. The user terminal may be a device used by a user, and the user terminal may include, but is not limited to a laptop computer, a smart phone, a tablet computer, a smart watch, or the like, or any combination thereof. In some embodiments, the communication device may be wirelessly connected (e.g., Bluetooth connected) to the user terminal.

The processors may be used to perform program assignments. In some embodiments, the processor of the folding cart 1000 may be a microprocessor.

In some embodiments, the processor may be disposed on the folding cart, and after obtaining and analyzing the pressure information monitored by the pressure sensor, the processor may upload the information analyzed and processed by the processor to the user terminal.

In some embodiments, the processor may be disposed on the user terminal, the pressure information of the goods on the folding cart 1000 monitored by the pressure sensor may be directly uploaded to the user terminal through the communication device, and the processor on the user terminal may analyze and process the pressure information. For example, the user terminal may determine a weight of the goods and a count of pieces of goods through the received pressure information monitored by the pressure sensor, and further use the received pressure information to send alarm information (e.g., goods drop alarm, goods anti-theft alarm) to the user.

In the folding cart 1000 of the above embodiments, the user may check the quantity and weight of the goods through the user terminal, and the processor may analyze and process the pressure information in real time. If it is analyzed that there is a risk in the folding cart 1000, an alarm may be sent to the user terminal in time, and the user may be quickly reminded that the folding cart 1000 may have a reduction in goods, so that the user may check the goods in time.

In some embodiments, the pressure sensor and the communication device may be activated when the folding cart is in the unfolded state. The pressure sensor and the communication device may be dormant when the folding cart is in the folded state. In some embodiments, the states of the pressure sensor and the communication device may be preset and changed at any time by the user through the user terminal according to needs, so that the pressure sensor and the communication device may be only activated when needed, and enter a dormant state when the pressure sensor and the communication device are not used to save power and service life.

Figure 13:
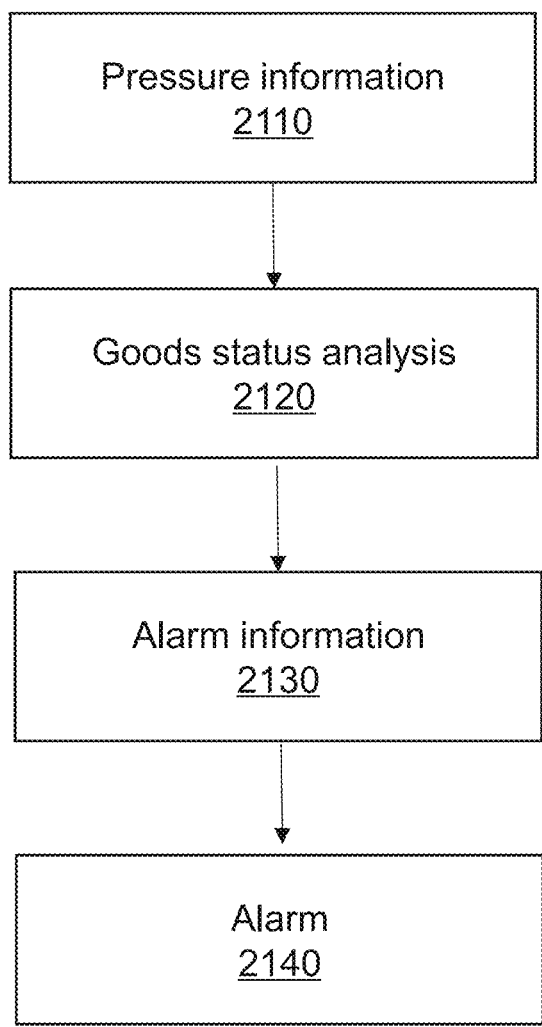
FIG. 13 is a schematic diagram illustrating a workflow of a processor of a folding cart according to some embodiments of the present disclosure.

In some embodiments, referring to FIG. 13, the processor may be configured to determine alarm information 2130 by performing goods status analysis 2120 based on the obtained pressure information 2110, and send an alarm 2140 to the user terminal based on the alarm information 2130.

The pressure information 2110 refers to pressure information on the folding cart 1000 detected by the pressure sensor in real time, i.e., the weight information of the goods carried by the folding cart 1000.

The goods status analysis 2120 refers to that the processor analyzes the status of the goods on the foldable cart 1000 based on the pressure information 2110. The status of the goods may include goods increase, goods decrease, goods standstill, goods movement, or any combination thereof. For example, if the pressure information detected by the pressure sensor increases with time, it may be determined that the goods are being loaded, and the processor may determine that each increase in pressure difference represents a weight of a piece of goods, and a count of times the pressure difference is increased expresses the quantity of goods loaded into the folding cart.

In some embodiments, when the status of the goods is analyzed by the processor as goods decrease, it may be determined that the goods in the folding cart 1000 are at risk.

The alarm information 2130 refers to a conclusion obtained after the processor analyzes the pressure information 2110 that there is a risk in the folding cart 1000 (i.e., the goods in the folding cart 1000 decrease). In some embodiments, the alarm information 2130 may include at least one of goods drop alarm information and goods anti-theft alarm information. More descriptions regarding the goods drop alarm information and the goods anti-theft alarm information may be found elsewhere in the present disclosure.

The alarm 2140 refers to an alarm signal that is sent to outside through the user terminal and may be perceived by the user. In some embodiments, the alarm 2140 may include a sound alarm, a vibration alarm, a voice alarm, or any combination thereof. In some embodiments, the alarm information 2130 may be set by the user on the user terminal whether to turn on an alarm reminder. For example, when the user unloads goods, the alarm reminder may be manually turned off first, so as to prevent the processor from misjudging the user unloading goods as risk information and send the alarm 2140 to the user terminal.

In the folding cart 1000 in the above embodiments, the processor may analyze in real time whether there is a risk in the goods in the folding cart 1000. If there is a risk, an alarm may be send to the user terminal, the user may immediately check the goods in the folding cart 1000 when the alarm is perceived, which can effectively improve the safety of the folding cart 1000 during use.

In some embodiments, the processor may be further configured to identify a static pressure increase information sequence in a pressure information sequence, and determine a count and weight information of the one or more goods in the folding cart; monitor a current pressure reduction in pressure change information when the folding cart moves; determine goods drop risk information based on the current pressure reduction in response to a determination that the current pressure reduction meets a preset change condition; and send the goods drop alarm information to the user terminal based on the goods drop risk information.

The pressure information sequence refers to a sequence of pressure information detected by the pressure sensor, i.e., a sequence of the pressure information obtained by the processor and arranged according to obtaining times.

The static pressure increase information sequence refers to a sequence of pressure information detected by the pressure sensor when the folding cart 1000 is in a static state, i.e., a sequence in which the pressure information obtained by the processor and arranged according to the obtaining times when the folding cart 1000 is in a same position and is being loaded.

In some embodiments, a positioning device may be disposed on the folding cart 1000, and the processor may obtain current positioning information of the folding cart 1000 in real time through the positioning device. If the current positioning information of the folding cart 1000 remains unchanged within a period of time, it may indicate that the folding cart 1000 is in the static state. If the current positioning information of the folding cart 1000 also changes with time, it may indicate that the folding cart 1000 is in a moving state.

The processor may obtain the pressure information sequence and identify the static pressure increase information sequence in the pressure information sequence based on the current positioning information of the folding cart 1000.

The determining the count and weight information of the one or more goods may be understood as determining the count and weight information of the goods by monitoring an increase value of the pressure information and the count of increases in the pressure information when an increase in pressure is recognized. For example, if the pressure information increases by 9.8 N, the weight of the goods put in this time is 9.8 N (mass is 1 kg), and every time the pressure information is increased, the count of goods may be increased by one. Therefore, the count and weight information of one or more goods in the folding cart may be determined based on the static pressure increase information sequence.

The current pressure reduction refers to a pressure decrease value currently detected by the pressure sensor. The processor may calculate the current pressure reduction based on two adjacent current pressure values, i.e., a difference between the two adjacent current pressure values may be the current pressure reduction.

In some embodiments, the preset change condition may include that the current pressure reduction is greater than or equal to a first threshold, and the first threshold may be determined based on a minimum value in the static pressure increase information sequence and a mean value of the pressure change information when the folding cart moves.

The minimum value in the static pressure increase information sequence may be understood as a pressure increase information value when a lightest piece of goods is loaded in the folding cart. The mean value of the pressure change information when the folding cart moves refers to a mean value of differences between the pressure information when the folding cart moves and the pressure information when the folding cart is in the static state monitored by the pressure sensor. The difference in the pressure information may be generated by jitter of the folding cart road caused by a factor such as road inequality.

The first threshold may be a relatively small value of the static pressure increase information sequence and the mean value of the pressure change information when the folding cart moves.

When it is detected that the pressure information of the folding cart decreases during the movement, and the current pressure reduction exceeds the first threshold, it may be determined that there is a high risk of goods drop, and goods drop alarm information may be sent to the user terminal.

The first threshold may be preset in the processor, which may effectively exclude the pressure change information generated by the jitter of the folding cart 1000 caused by the factor of road inequality, thereby improving the accuracy of determination of the goods drop risk information.

In the folding cart 1000 of the above embodiments, the preset change condition (i.e., the first threshold) may be added to the processor, which can effectively reduce the risk of misjudgment of the processor on the folding cart 1000.

In some embodiments, the processor may be further configured to determine a location attribute of a current location of the user terminal based on the positioning information of the user terminal, wherein the location attribute includes a secure region and a non-secure region; in response to a determination that the location attribute of the current location of the user terminal is the non-secure region, determine a positional relationship between the user terminal and the folding cart and a motion state of the folding cart based on a communication connection state between the communication device and the user terminal and a motion state of the user terminal; determine the goods anti-theft risk information based on the positional relationship between the user terminal and the folding cart, the motion state of the folding cart, and a change of the pressure information; and send the goods anti-theft alarm information to the user terminal based on the goods anti-theft risk information.

The positioning information of the user terminal may be positioned by the positioning device installed in the user terminal. The location attribute of the current location of the user terminal may be marked by the user which locations are secure regions (i.e., locations where there is a high probability that there will be no problem of theft, such as homes, companies, etc.). When it is detected that the current location of the user terminal is not in the secure region, it may be determined that the location attribute of the user terminal is the non-secure region. When the user terminal is in the secure region, and if the pressure information decreases, the user may unload the goods. When the user terminal is in the non-secure region, and if the pressure information decreases, the goods may be stolen.

The communication connection state between the communication device and the user terminal refers to a communication connection strength between the communication device and the user terminal. The higher the communication connection strength, the closer the location of the communication device to the location of the user terminal.

The motion state of the user terminal may include a static state and a moving state. Whether the motion state of the user terminal is the static state or the moving state may be determined according to whether the positioning information of the user terminal changes according to a change of time. That is, if the current location of the user terminal changes according to the change of time, it may be determined that the user terminal is in the moving state.

The positional relationship between the user terminal and the folding cart refers to a distance relationship between the positioning positions of the user terminal and the folding cart. In some embodiments, if the user terminal is in the moving state (i.e., the user is moving), and the connection strength between the user terminal and the communication device does not change much, it may indicate that the positional relationship between the folding cart and the user terminal does not change much, and the folding cart may also be in the moving state. If the connection strength between the user terminal and the communication device changes greatly, or even the connection strength becomes weaker and weaker, it may indicate that a distance between the folding cart and the user terminal changes greatly, and at this time, if the user terminal is moving, it may be considered that the folding cart is in the static state.

The pressure information change may include the current pressure reduction. If the current pressure reduction of the folding cart exceeds a second threshold, and the location of the folding cart is relatively far from the location of the user terminal (here refers to a positional relationship between the folding cart and the user terminal at the time point corresponding to the current pressure reduction), it may be determined that the goods in the folding cart 1000 are partially stolen or the entire folding cart 1000 is stolen, and the processor may generate the goods anti-theft risk information and send the goods anti-theft alarm information to the user terminal based on the goods anti-theft risk information.

The second threshold may be a threshold used to determine whether the goods are stolen, and may be determined based on the pressure information sequence. The second threshold may be a minimum weight of a single piece of goods in the folding cart 1000, i.e., a minimum value in the static pressure increase information sequence. The second threshold may also be a minimum weight of the remaining goods. For example, when the user needs to pick up the goods in the middle of carrying the goods using the folding cart 1000, the user may change the current pick-up location to a temporary secure region through the user terminal before picking up the goods, and the processor may obtain the count and weight information of the goods taken out in the temporary secure region through the pressure sensor. If the minimum value in the static pressure increase information sequence is taken out, the processor may determine a current minimum value based on the count and weight information of the goods taken out and the static pressure increase information sequence, and the current minimum value may be minimum weight of the remaining goods.

In some embodiments, a distance threshold may also be preset in the processor. The distance threshold may be manually set by the user on the user terminal, and the distance threshold may indicate a furthest distance that the user terminal may leave the folding cart 1000 (e.g., the distance threshold may be set to 1 meter, 2 meters, or 3 meters, etc.). If the positional relationship between the user terminal and the folding cart exceeds the distance threshold in the non-secure region (indicating that the folding cart is relatively far away from the user), the entire folding cart and the goods on the folding cart may have a relatively great risk of being stolen, and the processor may analyze and generate the goods anti-theft risk information, and the processor may send the goods anti-theft alarm information to the user terminal in response to the goods anti-theft risk information.

In the folding cart 1000 of the above embodiment, the secure region and the non-secure region may be set manually, which can further reduce the risk misjudgment of the processor on the folding cart 1000, i.e., improve the accuracy of the goods anti-theft risk information analyzed by the processor.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A folding cart, comprising:
a cart frame assembly including a plurality of sets of support rod assemblies and a base frame hinged to lower ends of the plurality of sets of support rod assemblies, wherein for one set of support rod assemblies,
the one set of support rod assemblies includes at least two support rods, and two adjacent support rods are hinged through a first connecting part in the one set of support rod assemblies;
an upper end of the first connecting part is fixedly hinged to the at least two support rods, a lower end of the first connecting part is slidingly hinged to the at least two support rods, and the first connecting part and the base frame are hinged through at least one second connecting part, wherein the at least one second connecting part includes two first folding pieces and two second folding pieces, each of the two first folding pieces and each of the two second folding pieces are hinged with each other, one end of each of the two first folding pieces away from the first connecting part is hinged to the base frame, and one end of each of the two second folding pieces away from the base frame is hinged to the first connecting part; and
the first connecting part and the at least one second connecting part are folded along a first horizontal direction, and two support rods oppositely disposed on a same side in two adjacent sets of the plurality of sets of support rod assemblies are connected through a third connecting part;

a wheel assembly disposed at a lower end of the cart frame assembly to realize movement of the cart frame assembly; and
a handrail assembly disposed on the cart frame assembly, and the cart frame assembly being driven to move through the handrail assembly under an action of an external force, wherein
the handrail assembly is rotatably connected to the cart frame assembly to make the handrail assembly rotate at least on a first plane.

2. The folding cart of claim 1, wherein
the handrail assembly includes a handrail rod, at least one fixing mount, and at least one rotating connector; and
the at least one fixing mount is fixedly connected to the cart frame assembly, and the handrail rod is rotatably connected to the at least one fixing mount through the at least one rotating connector to make the handrail rod rotate around the at least one fixing mount at least on the first plane.

3. The folding cart of claim 2, wherein
the handrail rod includes two diagonal struts, a vertical rod, and a connecting mount;
one end of each of the two diagonal struts is fixedly connected to the vertical rod through the connecting mount, and another end of the each of the two diagonal struts is rotatably connected to two fixing mounts of the at least one fixing mount through two rotating connectors of the at least one rotating connector; and
the two fixing mounts are symmetrically fixed on the two support rods in the one set of support rod assemblies.

4. The folding cart of claim 1, wherein
the handrail assembly includes at least one fixing mount, a handrail cross rod, a handrail vertical rod, and a universal adapter;
the at least one fixing mount is fixedly connected to the cart frame assembly, and two ends of the handrail cross rod are fixedly connected to two fixing mounts of the at least one fixing mount; and
the handrail vertical rod is rotatably connected to the handrail cross rod through the universal adapter to make the handrail vertical rod rotate around the universal adapter at least on the first plane or a second plane.

5. The folding cart of claim 1, wherein the third connecting part is hinged between the two support rods disposed on the same side in the plurality of sets of support rod assemblies, an upper end of the third connecting part is fixedly hinged to the support rods disposed on the same side, a lower end of the third connecting part is slidingly hinged to the support rods disposed on the same side, the third connecting part is folded along a second horizontal direction, and the base frame is folded along a vertical direction.

6. The folding cart of claim 5, wherein an upper end of the support rod disposed on the same side is fixedly provided with a fixing hinged mount, the support rod disposed on the same side is slidingly sleeved with a sliding hinged mount along an axis direction of the support rod disposed on the same side, the upper ends of the first connecting part and the third connecting part are hinged to the fixing hinged mount, and the lower ends of the first connecting part and the third connecting part are hinged to the sliding hinged mount.

7. The folding cart of claim 6, wherein
the first connecting part includes a plurality of mutually hinged long rod hinged sets, and for each long rod hinged set, the long rod hinged set includes a first long rod and a second long rod that are mutually hinged and distributed in an X-shape;

outer ends of two first long rods in two long rod hinged sets located on an outermost side are respectively hinged to two fixing hinged mounts, and outer ends of two second long rods in the two long rod hinged sets located on the outermost side are respectively hinged to two sliding hinged mounts; and the at least one second connecting part is hinged between the base frame and a long rod hinged set located in a middle of the plurality of mutually hinged long rod hinged sets.

8. The folding cart of claim 6, wherein the third connecting part includes a plurality of mutually hinged short rod hinged sets, and for each short rod hinged set, the short rod hinged set includes a first short rod and a second short rod that are mutually hinged and distributed in an X-shape; and outer ends of two first short rods in two short rod hinged sets located on an outermost side are respectively hinged to two fixing hinged mounts, and outer ends of two second short rods in the two short rod hinged sets located on the outermost side are respectively hinged to two sliding hinged mounts.

9. The folding cart of claim 1, wherein the each of the two first folding pieces is provided with a groove, the each of the second folding pieces is provided with a bending boss, and the bending boss is limited in the groove when the at least one second connecting part is unfolded.

10. The folding cart of claim 1, wherein the base frame includes four first hinged mounts, two second hinged mounts, and two sets of hinged frames;

the four first hinged mounts are respectively fixed on four support rods in the two adjacent sets of the plurality of sets of support rod assemblies, the two second hinged mounts are respectively connected to lower ends of two second connecting parts of the at least one second connecting part, one set of hinged frames are hinged between two first hinged mounts of the four first hinged mounts and one end of the two second hinged mounts, another set of hinged frames are hinged between another two first hinged mounts of the four first hinged mounts and another end of the two second hinged mounts, and the two sets of hinged frames are folded along a vertical direction.

11. The folding cart of claim 10, wherein for each hinged frame, the hinged frame includes an X-shaped hinged mount and four hinged rods, two of the four hinged rods are in a set and distributed in an X-shape, one set of hinged rods is hinged between one first hinged mount of the four first hinged mounts and one second hinged mount of the two second hinged mounts, another set of hinged rods is hinged between another first hinged mount of the four first hinged mounts and another second hinged mount of the two second hinged mounts, and axes of the two hinged rods in each set coincide with each other and are hinged through the X-shaped hinged mount.

12. The folding cart of claim 11, wherein the X-shaped hinged mount further includes a spring and a limit device, the spring is in a compressed state when the base frame is unfolded, and the limit device limits the base frame to maintain in an unfolded state, and the spring elongates when the base frame is folded.

13. The folding cart of claim 11, wherein a push-pull handle is disposed on the X-shaped hinged mount, and the push-pull handle is connected above a midpoint of the X-shaped hinged mount.

14. The folding cart of claim 1, further comprising:

a communication device, at least one pressure sensor, and a processor, wherein the at least one pressure sensor is disposed on the base frame and is configured to monitor pressure information of goods that the folding cart bears, the processor is configured to obtain and analyze the pressure information monitored by the pressure sensor, and the communication device communicates with a user terminal and uploads the information analyzed and processed by the processor to the user terminal.

15. The folding cart of claim 14, wherein the processor is configured to:

determine alarm information by performing goods status analysis based on the obtained pressure information; and send an alarm to the user terminal based on the alarm information, wherein the alarm information includes at least one of goods drop alarm information or goods anti-theft alarm information.

16. The folding cart of claim 15, wherein the processor is further configured to:

identify a static pressure increase information sequence in a pressure information sequence, and determine a count and weight information of one or more goods in the folding cart;

monitor a current pressure reduction in pressure change information when the folding cart moves;

determine goods drop risk information based on the current pressure reduction in response to a determination that the current pressure reduction meets a preset change condition; and send the goods drop alarm information to the user terminal based on the goods drop risk information.

17. The folding cart of claim 16, wherein the preset change condition includes that the current pressure reduction is greater than or equal to a first threshold, and the first threshold is determined based on a minimum value in the static pressure increase information sequence and a mean value of the pressure change information when the folding cart moves.

18. The folding cart of claim 15, wherein the processor is further configured to:

determine a location attribute of a current location of the user terminal based on positioning information of the user terminal, wherein the location attribute includes a secure region and a non-secure region;

in response to a determination that the location attribute of the current location of the user terminal is the non-secure region, determine a positional relationship between the user terminal and the folding cart and a motion state of the folding cart based on a communication connection state between the communication device and the user terminal and a motion state of the user terminal;

determine the goods anti-theft risk information based on the positional relationship between the user terminal and the folding cart, the motion state of the folding cart, and a change of the pressure information; and send the goods anti-theft alarm information to the user terminal based on the goods anti-theft risk information.

\* \* \* \* \*